US012532101B2

(12) United States Patent
Wang et al.

(10) Patent No.: US 12,532,101 B2
(45) Date of Patent: Jan. 20, 2026

(54) MICROPHONE

(71) Applicant: AAC Microtech (Changzhou) Co., Ltd., Jiangsu (CN)

(72) Inventors: Yaqi Wang, Changzhou (CN); Rui Cai, Changzhou (CN); Zhongzong Gan, Changzhou (CN); Xingfu Chen, Changzhou (CN); Rui Zhang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 164 days.

(21) Appl. No.: 18/628,844

(22) Filed: Apr. 8, 2024

(65) Prior Publication Data

US 2025/0193568 A1 Jun. 12, 2025

Related U.S. Application Data

(63) Continuation of application No. PCT/CN2023/136958, filed on Dec. 7, 2023.

(51) Int. Cl.
*H04R 1/08* (2006.01)
*H04R 1/04* (2006.01)

(52) U.S. Cl.
CPC ............... *H04R 1/083* (2013.01); *H04R 1/04* (2013.01)

(58) Field of Classification Search
CPC .... H04R 1/04; H04R 1/083; H04R 2201/003; H04R 19/04
See application file for complete search history.

(56) References Cited

U.S. PATENT DOCUMENTS

2025/0035466 A1* 1/2025 Chang .................. G01L 19/147

* cited by examiner

*Primary Examiner* — Kile O Blair
(74) *Attorney, Agent, or Firm* — Wiersch Law Group

(57) ABSTRACT

The present disclosure discloses a microphone including: a circuit board; a housing engaged with the circuit board for enclosing a receiving space; a plurality of functional components located in the receiving space and electrically connected with the circuit board; and a plurality of baffles received in the receiving space and arranged at intervals along a direction parallel with a plane the circuit board located; the plurality of baffles is configured to divide the receiving space into a plurality of isolation chambers; at least two selected functional components has different functions; each isolation chamber is provided to receive at least one functional component; the functional components with different function are isolated in different isolation chambers. The microphone in the present disclosure has stable performance.

9 Claims, 7 Drawing Sheets

MICROPHONE

FIELD OF THE PRESENT DISCLOSURE

The present disclosure relates to acoustic-electric conversion technologies, especially relates to a microphone.

DESCRIPTION OF RELATED ART

With the development of wireless communication, user has increasing requirements about high connection quality for mobile phones. A microphone served as voice pickup device has significant impact on connection quality of mobile phones.

In related art, the microphone generally includes a circuit board, a housing engaged with the circuit board for enclosing a receiving cavity and several functional components received in the housing and electrically connected to the circuit board. At least two functional components have different function. The functional component includes an ASIC chip and a transducer. At least one of the transducers is microphone for picking up acoustic signal. The transducers of other functional components could be configured to pick up air pressure change or gas content. However, the ASIC chips coordinated with different functional components generate different amount of heat during operation. Especially, high heat generated by ASIC chips can be transmitted through the circuit board or/and housing, as well as the thermal movement of the air in the containment space, resulting in performance deduction of the transducer which is highly susceptible to thermal interference.

Therefore, it is necessary to provide an improved microphone to overcome the problems mentioned above.

SUMMARY OF THE INVENTION

One object of the present disclosure is to provide a microphone with stable performance.

A microphone including: a circuit board; a housing engaged with the circuit board for enclosing a receiving space; a plurality of functional components located in the receiving space and electrically connected with the circuit board; and a plurality of baffles received in the receiving space and arranged at intervals along a direction parallel with a plane the circuit board located; wherein the plurality of baffles is configured to divide the receiving space into a plurality of isolation chambers; at least two selected functional components has different functions; each isolation chamber is provided to receive at least one functional component; the functional components with different function are isolated in different isolation chambers.

As an improvement, a plurality of first adhesive strips is bonded to a surface of the circuit board facing the receiving space; each first adhesive strip is bonded to one corresponding baffle.

As an improvement, a plurality of second adhesive strips is bonded to a surface of the housing facing the receiving space; each second adhesive strip is bonded to one corresponding baffle.

As an improvement, an orthogonal projection of the second adhesive strip on the circuit board is overlapped with the first adhesive strip.

As an improvement, the first adhesive strip and the second adhesive strip are boned to the baffle by glue or solder paste.

As an improvement, the housing and the baffles are integrally formed.

As an improvement, the housing is made of metal capable of electromagnetic shielding; the housing and the baffles are made of identical metal.

As an improvement, the functional component includes an ASIC chip and a transducer; at least one transducer of the plurality of functional components is a microphone transducer; the microphone transducer is mounted on the circuit board for dividing the isolation chamber into a first sound cavity and a second sound cavity; a first sound hole provided on the circuit board is configured to connect the first sound cavity with outside.

As an improvement, a second sound hole provided on the housing is configured to connect the second sound cavity with outside.

BRIEF DESCRIPTION OF THE DRAWINGS

The accompanying drawings illustrate embodiments and constitute part of the specification, and together with the specification, serve to explain exemplary embodiments of the present disclosure. The accompanying drawings shown are only for illustrative purposes and do not limit the scope of the claims. In all the accompanying drawings, same reference signs refer to similar but not necessarily identical elements.

DETAILED DESCRIPTION OF THE EXEMPLARY EMBODIMENTS

In order to make the inventive objectives, features, and advantages of the present disclosure more understandable, the technical solutions in embodiments of the present disclosure will be described clearly and completely below with reference to the accompanying drawings in the embodiments of the present disclosure. It is apparent that the described embodiments are merely some of rather than all of the embodiments of the present disclosure. All other embodiments acquired by those skilled in the art without creative efforts based on the embodiments in the present disclosure shall fall within the protection scope of the present disclosure.

Please refer to FIGS. 1-7, a microphone 100 provided by an exemplary embodiment of the present disclosure includes a circuit board 1, a housing 3 engaged with the circuit board 1 for enclosing a receiving space A, and a plurality of functional components 5 located in the receiving space A and electrically connected with the circuit board 1. At least two selected functional components 5 have different functions.

Figure 1:
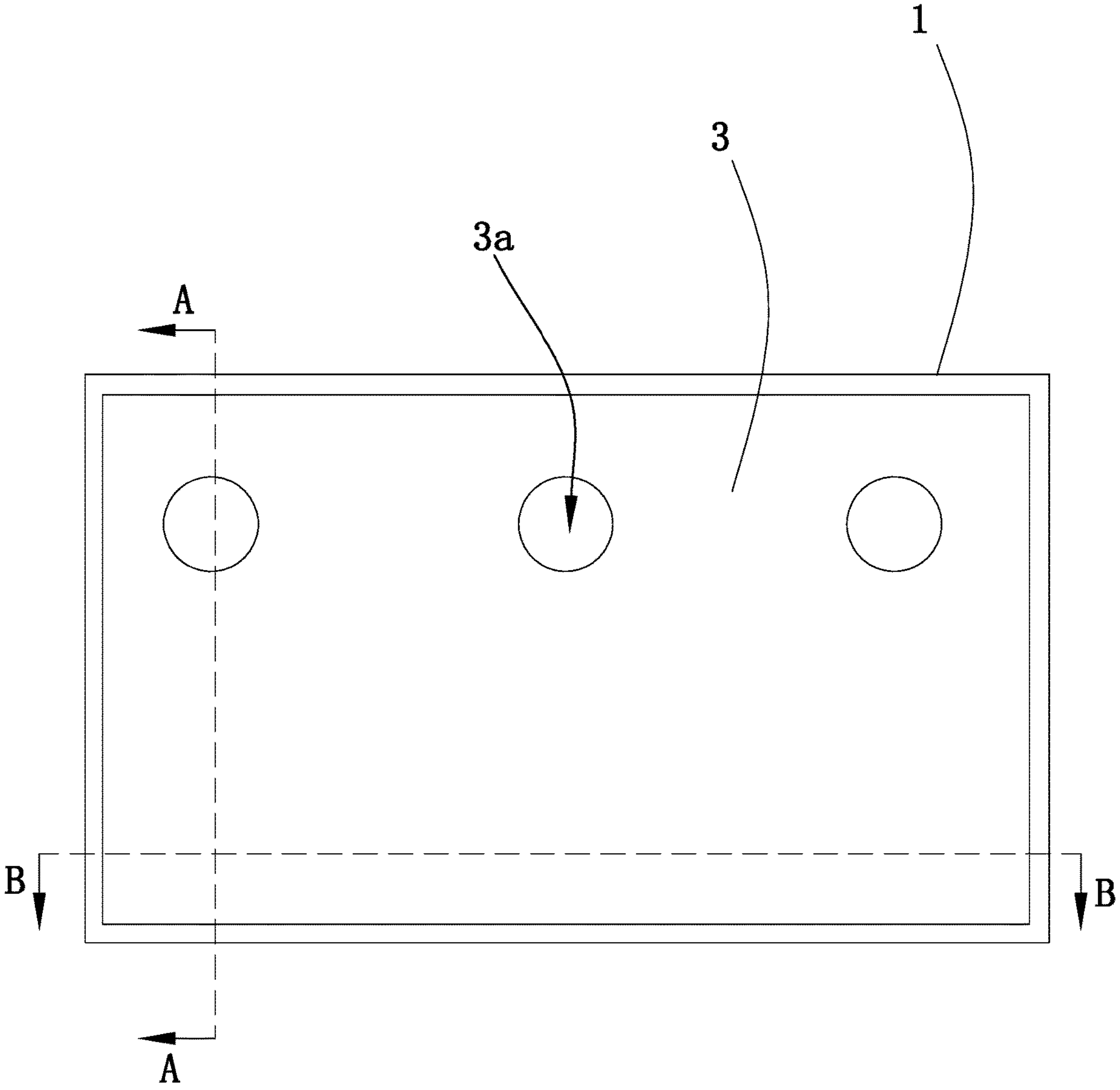
FIG. 1 is a vertical view of a microphone in accordance with an exemplary embodiment of the present disclosure.
Figure 2:
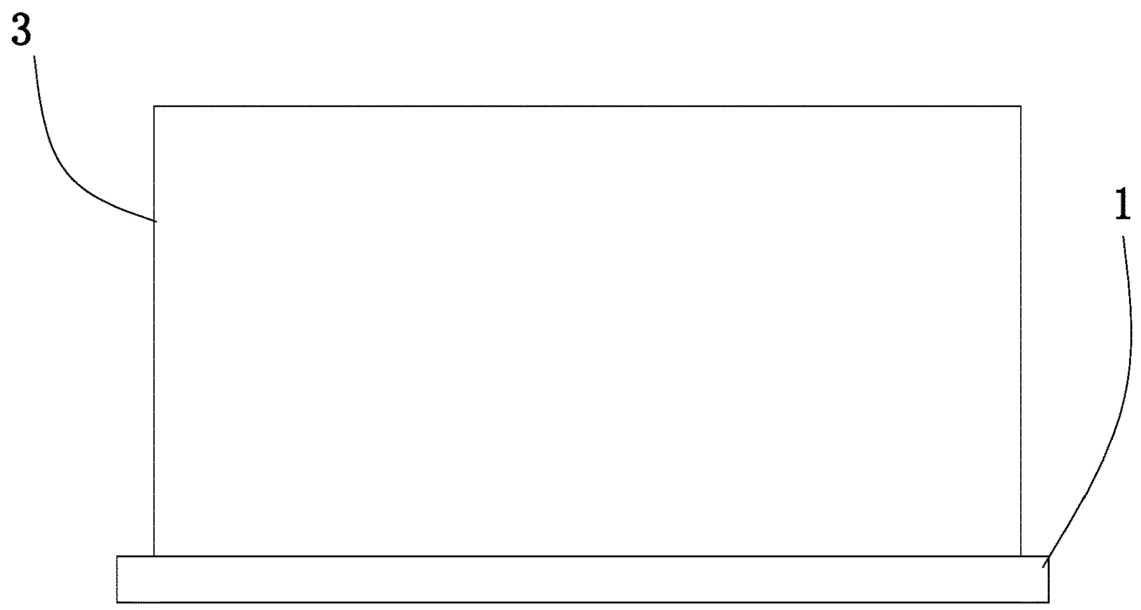
FIG. 2 is a front view of the microphone in FIG. 1.
Figure 3:
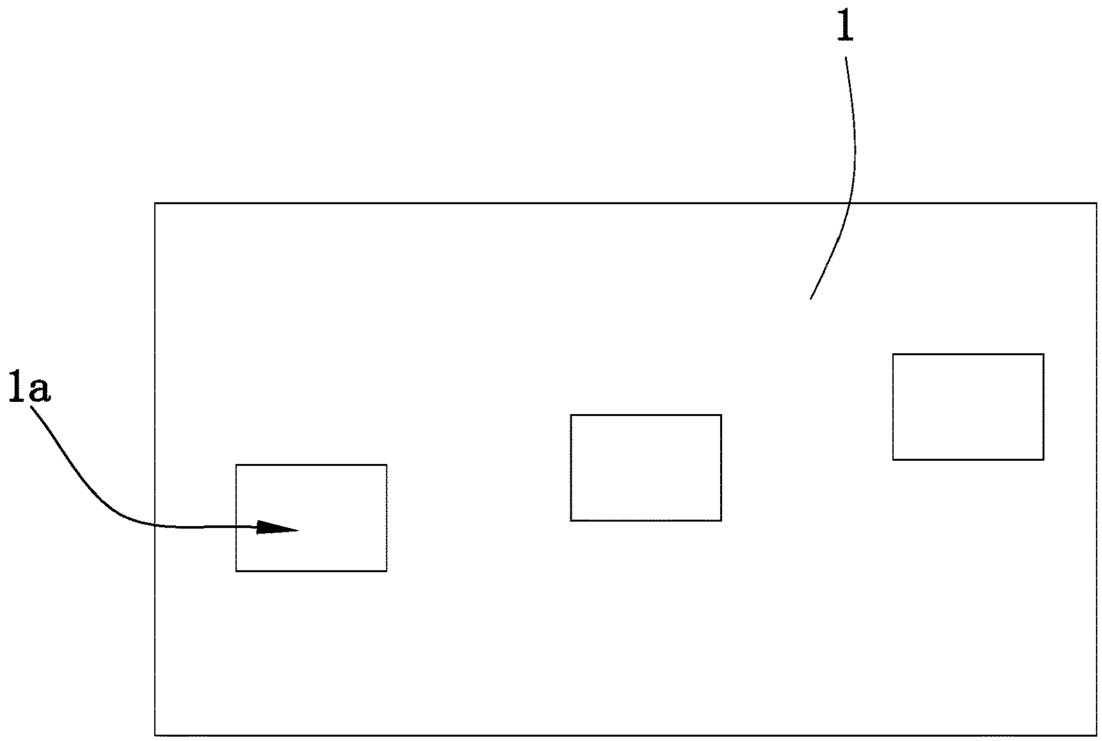
FIG. 3 is a top view of the microphone in FIG. 1.
Figure 4:
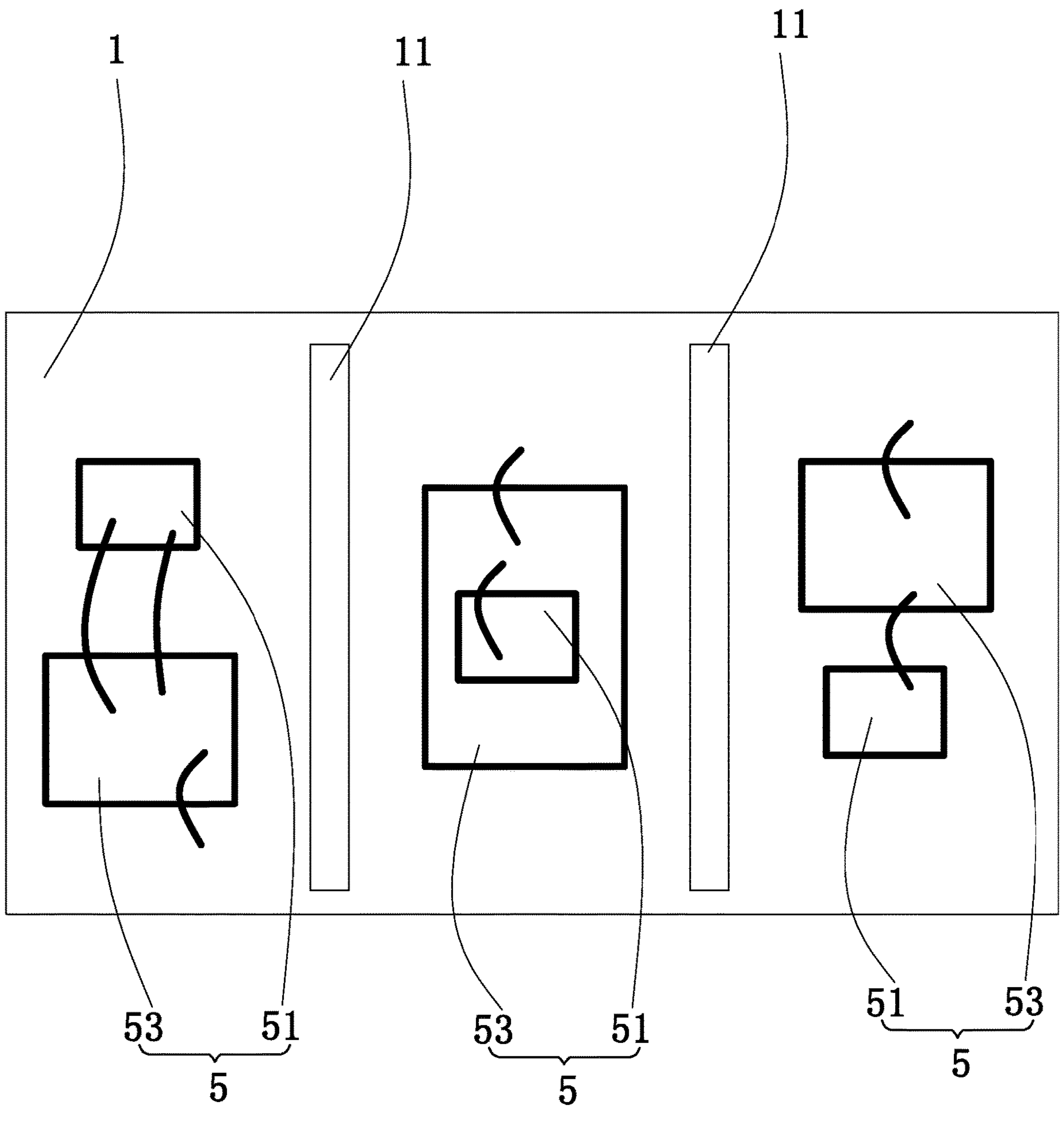
FIG. 4 is an isometric view of the microphone in FIG. 1 without a housing and a plurality of baffles.

Specifically, the functional component 5 includes an ASIC chip 51 and a transducer 53; at least one transducer 53 of the plurality of functional components 5 is a microphone transducer. In one embodiment as shown in FIG. 4, all the transducers 51 of the plurality of functional components 5 are microphone transducers with different sensitivity. It should be understood that the other transducers 53 of the plurality of the functional components 5 except for the functional component 5 having a microphone transducer could be pressure transducer or gas transducer in other embodiments of the present disclosure.

The microphone 100 further includes a plurality of baffles 7 received in the receiving space A and arranged at intervals along a direction parallel with a plane the circuit board 1 located. Moreover, the plurality of baffles 7 is configured to divide the receiving space A into a plurality of isolation chambers B. Each isolation chamber B is provided to receive at least one functional component 5. Especially, the functional components 5 with different function are isolated in different isolation chambers B. More specific, assuming that N baffles 7 are provided in the receiving space A to divide the receiving space A into N+1 isolation chambers B, every isolation chamber B is configured to receive one or more functional components 5, but two or more functional components with different functions cannot be arranged in one isolation chamber B.

In addition, a plurality of first adhesive strips 11 is bonded to a surface of the circuit board 1 facing the receiving space A. Each first adhesive strip 11 is bonded to one corresponding baffle 7. A plurality of second adhesive strips 31 is bonded to a surface of the housing 3 facing the receiving space A. Each second adhesive strip 31 is bonded to one corresponding baffle 7. By bonding the first adhesive strip 11 and the second adhesive strip 31 to the baffle 7 separately, it not only facilitates the assembly process of the microphone 100, but also effectively ensures the sealing performance between the baffle 7, the housing 3, and the circuit board 1.

Concretely, the first adhesive strip 11 and the second adhesive strip 31 are boned to the baffle 7 by glue or solder paste. During assembly process, firstly coat the glue or solder paste to the first adhesive strip 11 and the second adhesive strip 31 evenly, then bond the baffle 7 to the second adhesive strip 31, and finally bone the circuit board 1 to the housing 3. When the circuit board 1 is bonded to the housing 3, the baffle 7 is bonded to the first adhesive strip 11 accordingly.

Furthermore, an orthogonal projection of the second adhesive strip 31 on the circuit board 1 is overlapped with the first adhesive strip 11. Therefore, the bonding area between the baffle 7 and the first adhesive strip 11 and the second adhesive strip 31 could be ensured to improve the adhesive strength and the sealing reliability between the baffle 7 and the housing 3 and the circuit board 1.

Figure 5:
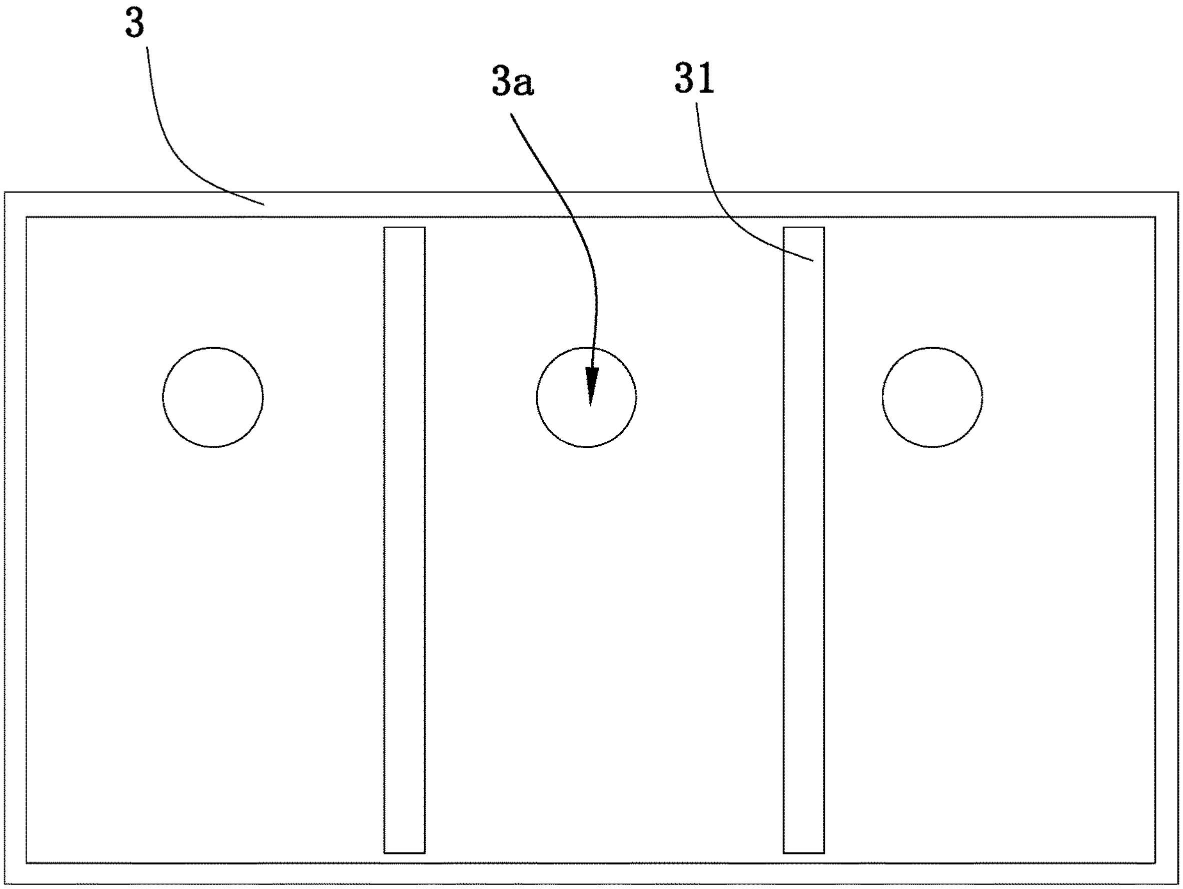
FIG. 5 is an isometric view of an adhesive strip and a housing of the microphone in FIG. 1.
Figure 7:
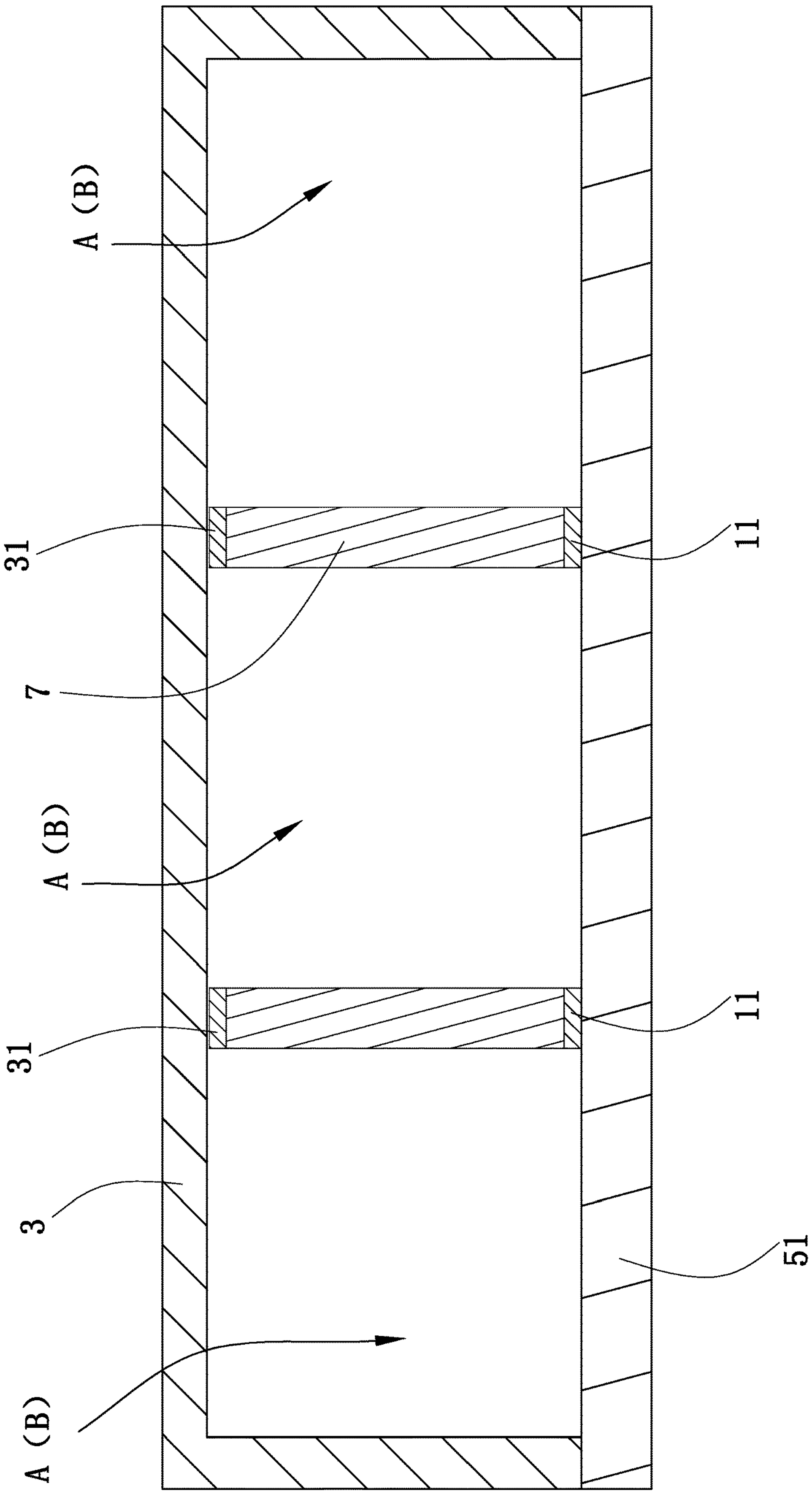
FIG. 7 is a section view of the microphone taken along line B-B in FIG. 1.

As shown in FIGS. 4-5 and FIG. 7, the baffle 7 is in flat shape. Accordingly, the first adhesive strip 11 is bar-shaped and the second adhesive strip 31 is in U shape, thus enabling the first adhesive strip 11 and the second adhesive strip 31 to enclose a closed ring shape structure. It should be noted that the baffle 7, the first adhesive strip 11 and the second adhesive strip 31 could also be curved shape.

As shown in FIG. 4 and FIG. 7, two baffles 7 are provided in receiving space A and spaced apart from each other along a direction parallel with a plane the circuit board 1 located. The two baffles 7 divide the receiving space into 3 isolation chambers B. Each isolation chamber B is configured to receive one functional component 5.

It should be stated that the baffle 7 could be made of metallic material or non-metallic material.

Furthermore, the housing 3 is made of metal capable of electromagnetic shielding, thereby effectively preventing interference from external electromagnetic waves on the microphone 100.

Figure 6:
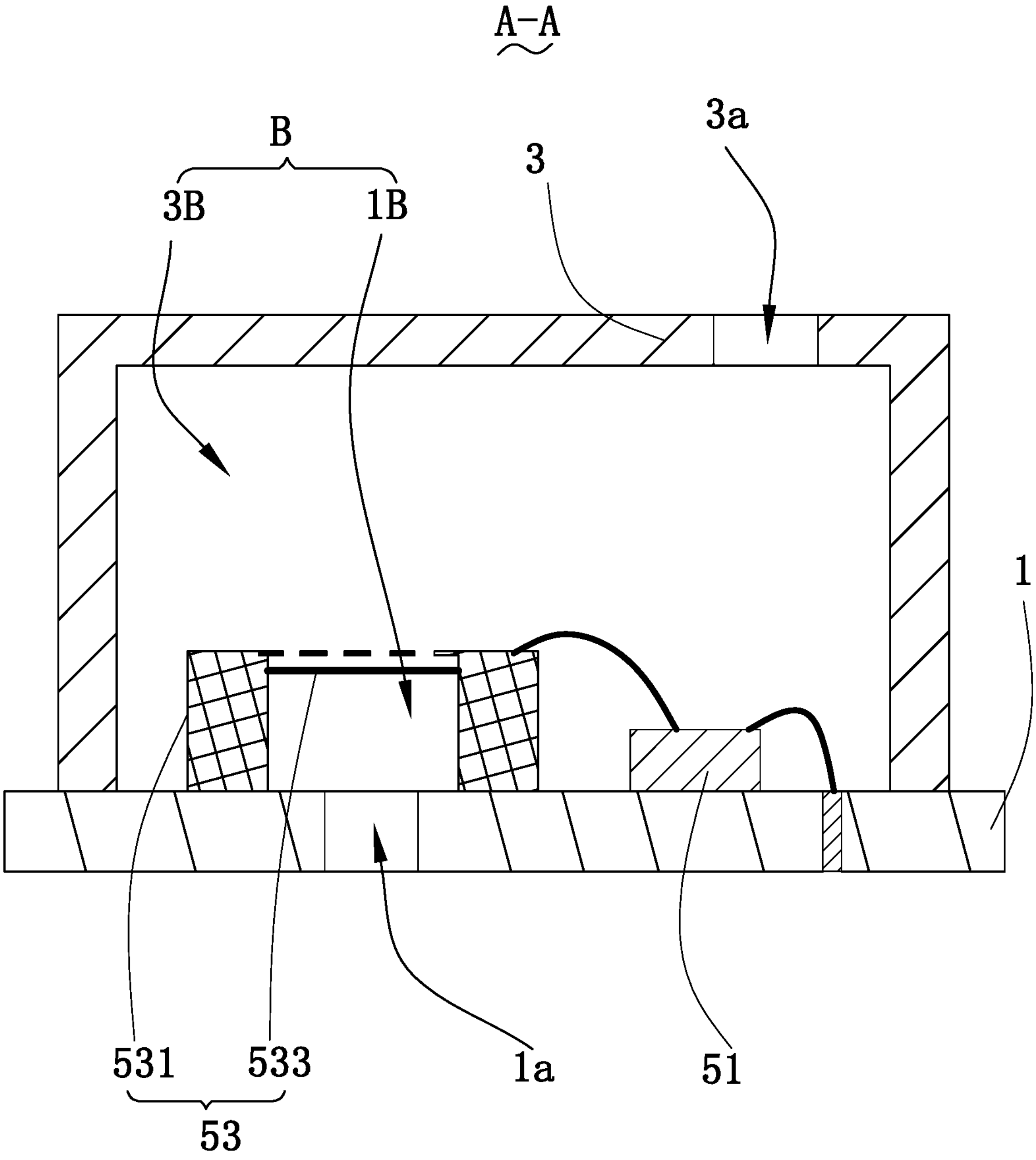
FIG. 6 is a section view of the microphone taken along line A-A in FIG. 1.

As shown in FIG. 6, the transducer 53 which is a microphone transducer is mounted on the circuit board 1 for dividing the isolation chamber B into a first sound cavity 1B and a second sound cavity 3B. A first sound hole 1*a* provided on the circuit board 1 is configured to connect the first sound cavity 1B with outside. Specifically, the transducer 53 in FIG. 6 includes a substrate 531 mounted on the circuit board 1 and a capacitance system 533 fixed to a side of the substrate 531 away from the circuit board 1. The first sound cavity 1B is enclosed by the substrate 531, the capacitance system 533 and the circuit board 1. The capacitance system 533 includes a diaphragm and a back plate arranged at an interval. Furthermore, a second sound hole 3*a* provided on the housing 3 is configured to connect the second sound cavity 3B with outside. Air vibration generated by the vibration of the diaphragm of the microphone transducer could achieve air convection between the second cavity 3B and external air, thereby accelerating heat dissipation. Besides, the second cavity 3B can also balance the pressure on both sides of the diaphragm of the microphone transducer.

Figure 8:
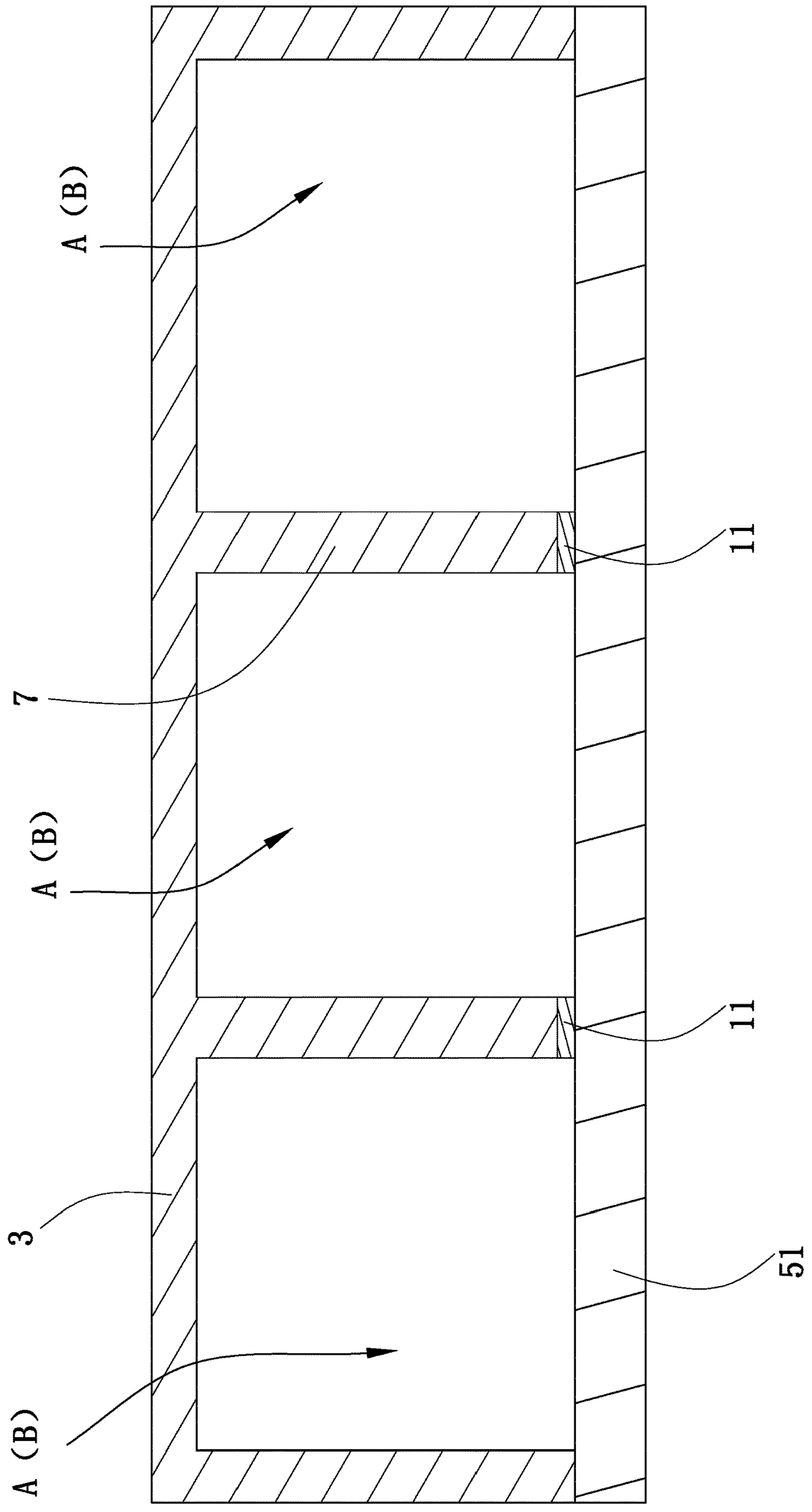
FIG. 8 is an isometric view of the microphone in accordance with another exemplary embodiment of the present disclosure.

In another embodiment of the present disclosure as shown in FIG. 8, the housing 3 and the baffle 7 is integrated mold. It should be noted that the housing 3 and the baffle 7 could be formed by stamping process no matter they are made of metal material or plastic material.

Compared with the related art, a plurality of baffles received in the receiving space and arranged at intervals along a direction parallel with a plane the circuit board located; the plurality of baffles is configured to divide the receiving space into a plurality of isolation chambers in which the functional components with different function are isolated individually. Therefore, the baffles can prevent heat exchange between different functional components by isolating them in different isolation chambers, thus effectively avoiding performance deduction of the functional components which are highly susceptible to thermal interference.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A microphone comprising:

a circuit board;

a housing engaged with the circuit board for enclosing a receiving space;

a plurality of functional components located in the receiving space and electrically connected with the circuit board; and a plurality of baffles received in the receiving space and arranged at intervals along a direction parallel with a plane the circuit board located; wherein the plurality of baffles is configured to divide the receiving space into a plurality of isolation chambers; at least two selected functional components has different functions; each isolation chamber is provided to receive at least one functional component; the functional components with different function are isolated in different isolation chambers.

2. The microphone as described in claim 1, wherein a plurality of first adhesive strips is bonded to a surface of the circuit board facing the receiving space; each first adhesive strip is bonded to one corresponding baffle.

3. The microphone as described in claim 2, wherein a plurality of second adhesive strips is bonded to a surface of the housing facing the receiving space; each second adhesive strip is bonded to one corresponding baffle.

4. The microphone as described in claim 3, wherein an orthogonal projection of the second adhesive strip on the circuit board is overlapped with the first adhesive strip.

5. The microphone as described in claim 3, wherein the first adhesive strip and the second adhesive strip are boned to the baffle by glue or solder paste.

6. The microphone as described in claim 2, wherein the housing and the baffles are integrally formed.

7. The microphone as described in claim 6, wherein the housing is made of metal capable of electromagnetic shielding; the housing and the baffles are made of identical metal.

8. The microphone as described in claim 1, wherein the functional component comprises an ASIC chip and a transducer; at least one transducer of the plurality of functional components is a microphone transducer; the microphone transducer is mounted on the circuit board for dividing the isolation chamber into a first sound cavity and a second sound cavity; a first sound hole provided on the circuit board is configured to connect the first sound cavity with outside.

9. The microphone as described in claim 8, wherein a second sound hole provided on the housing is configured to connect the second sound cavity with outside.

* * * * *